United States Patent
Kruijswijk et al.

(10) Patent No.: US 10,322,648 B2
(45) Date of Patent: Jun. 18, 2019

(54) CONTROL DEVICE AND METHOD FOR TRACTION CONTROL FOR AN ELECTRIC DRIVE SYSTEM

(71) Applicant: Robert Bosch GmbH, Stuttgart (DE)

(72) Inventors: Emile Kruijswijk, Tilberg (NL); Julien Kuehl, Freiberg Am Neckar (DE); Markus Becker, Tamm (DE); Vincent Schulte-Coerne, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 320 days.

(21) Appl. No.: 15/119,751

(22) PCT Filed: Dec. 22, 2014

(86) PCT No.: PCT/EP2014/078962
§ 371 (c)(1),
(2) Date: Aug. 18, 2016

(87) PCT Pub. No.: WO2015/128032
PCT Pub. Date: Sep. 3, 2015

(65) Prior Publication Data
US 2017/0066345 A1    Mar. 9, 2017

(30) Foreign Application Priority Data

Feb. 27, 2014 (DE) .......... 10 2014 203 565

(51) Int. Cl.
*B60L 15/20* (2006.01)
*B60L 3/10* (2006.01)
(Continued)

(52) U.S. Cl.
CPC .......... *B60L 15/2036* (2013.01); *B60L 3/102* (2013.01); *B60L 3/104* (2013.01); *B60L 3/106* (2013.01);
(Continued)

(58) Field of Classification Search
CPC ...... B60L 15/2036; B60L 3/102; B60L 3/104; B60L 3/106; B60L 3/108; B60L 3/12;
(Continued)

(56) References Cited

U.S. PATENT DOCUMENTS

| | | | | |
|---|---|---|---|---|
| 9,669,698 | B2 * | 6/2017 | Crecelius | B60K 6/40 |
| 9,919,340 | B2 * | 3/2018 | Kreidler | B05D 5/00 |
| 2006/0025917 | A1 * | 2/2006 | Pandey | B60K 6/46 |
| | | | | 701/82 |
| 2008/0238108 | A1 * | 10/2008 | Edelson | B60L 11/04 |
| | | | | 290/400 |
| 2009/0132116 | A1 * | 5/2009 | Tanaka | B60W 20/10 |
| | | | | 701/36 |

(Continued)

FOREIGN PATENT DOCUMENTS

| | | |
|---|---|---|
| DE | 102010062646 | 6/2012 |
| DE | 1 12013002128 | 12/2014 |

(Continued)

OTHER PUBLICATIONS

Machine Translation DE-102010062646-A1 (Year: 2012).*
(Continued)

*Primary Examiner* — Anne M Antonucci
*Assistant Examiner* — James E Stroud
(74) *Attorney, Agent, or Firm* — Michael Best & Friedrich LLP

(57) ABSTRACT

The invention relates to a control device for a voltage transformer of an electrically operated vehicle, which voltage transformer feeds an n-phase electric machine, n>1. The control device comprises an observer unit, which is designed to determine a present rotational speed of the electric machine and a present output current of the voltage transformer, a computing unit, which is coupled to the observer unit and which is designed to compute an instantaneous wheel speed of the wheels of the vehicle in dependence on
(Continued)

the determined present rotational speed, and a slip control unit, which is coupled to the computing unit and which is designed to at least temporarily apply a current correction amount to the output current of the voltage transformer if the present change of the wheel speed of the wheels exceeds a first predetermined threshold value.

11 Claims, 2 Drawing Sheets

(51) Int. Cl.
    *B60L 3/12*     (2006.01)
    *B60W 10/08*     (2006.01)

(52) U.S. Cl.
    CPC ............... *B60L 3/108* (2013.01); *B60L 3/12* (2013.01); *B60W 10/08* (2013.01); *B60L 2220/12* (2013.01); *B60L 2220/14* (2013.01); *B60L 2220/18* (2013.01); *B60L 2240/12* (2013.01); *B60L 2240/421* (2013.01); *B60L 2240/423* (2013.01); *B60L 2240/461* (2013.01); *B60L 2240/527* (2013.01); *B60L 2240/529* (2013.01); *B60L 2250/26* (2013.01); *B60L 2260/42* (2013.01); *Y02T 10/642* (2013.01); *Y02T 10/7258* (2013.01)

(58) Field of Classification Search
    CPC ............ B60L 2220/12; B60L 2220/14; B60L 2220/18; B60L 2240/12; B60L 2240/421; B60L 2240/423; B60L 2240/461; B60L 2240/527; B60L 2250/26; B60L 2260/42; B60W 10/08; Y02T 10/642; Y02T 10/7258

USPC .......................................................... 701/22
See application file for complete search history.

(56) References Cited

U.S. PATENT DOCUMENTS

| | | | |
|---|---|---|---|
| 2010/0220501 A1* | 9/2010 | Krause | H02M 3/33584 363/17 |
| 2011/0257847 A1* | 10/2011 | Uematsu | B60T 8/172 701/48 |
| 2011/0270497 A1* | 11/2011 | Uematsu | B60T 8/175 701/50 |
| 2012/0279793 A1* | 11/2012 | Kikuchi | B60T 8/175 180/197 |
| 2013/0253755 A1 | 9/2013 | Xu et al. | |
| 2014/0191624 A1* | 7/2014 | Jahshan | H02K 35/02 310/68 B |
| 2015/0318772 A1* | 11/2015 | Jahshan | H02P 23/00 318/400.41 |
| 2017/0066345 A1* | 3/2017 | Kruijswijk | B60L 3/104 |

FOREIGN PATENT DOCUMENTS

| | | |
|---|---|---|
| EP | 1389555 | 2/2004 |
| EP | 2527190 | 11/2012 |
| JP | H08182118 A | 7/1996 |
| JP | 2006283591 A | 10/2006 |
| WO | 2013157484 | 10/2013 |

OTHER PUBLICATIONS

International Search Report for Application No. PCT/EP2014/078962 dated Apr. 29, 2015 (English Translation, 2 pages).

\* cited by examiner

CONTROL DEVICE AND METHOD FOR TRACTION CONTROL FOR AN ELECTRIC DRIVE SYSTEM

BACKGROUND OF THE INVENTION

The invention relates to a control device and to a method for traction control in an electric drive system, in particular in electrically operated vehicles that have electric motors.

In present-day motor vehicles, auxiliary automatic and semi-automatic electronic systems are frequently integrated, which improve the driving stability of the vehicle, for example anti-lock braking systems (ABS), electronic stability programs (ESP) or traction control systems (TCS). In the case of traction control systems, a multiplicity of sensors is required, the measuring values of which directly or indirectly enable conclusions to be drawn about the slip between the underlying surface and the vehicle wheel. Typical sensors are steering angle sensors, rotational speed sensors, acceleration sensors and wheel speed sensors.

There is however a need for solutions for a traction control in electric drive systems in which the cost and effort of implementing the control are as low as possible. A need especially exists for a traction control which does not include wheel rotational speed sensors or respectively wheel speed sensors.

SUMMARY OF THE INVENTION

According to one aspect, the present invention therefore relates to a control device for a voltage transformer of an electrically operated vehicle, which voltage transformer feeds an n-phase electric machine, $n \geq 1$. The control device comprises an observer unit, which is designed to determine a present rotational speed of the electric machine and a present output current of the voltage transformer, a computing unit, which is coupled to the observer unit and which is designed to compute an instantaneous wheel speed of the wheels of the vehicle in dependence on the determined present rotational speed, and a slip control unit, which is coupled to the computing unit and which is designed to at least temporarily apply a current correction amount to the output current of the voltage transformer if the present change of the wheel speed of the wheels exceeds a first predetermined threshold value.

According to a further aspect, the present invention relates to an electric drive system for an electrically operated vehicle. The electric drive system comprises an n-phase electric machine, with $n \geq 1$, a voltage transformer, which is coupled to the n-phase electric machine and which is designed to provide an n-phase supply voltage to the electric machine, and a control device according to the invention, which is coupled to the electric machine and to the voltage transformer and which is designed to provide an output current control signal to the voltage transformer for the traction control.

According to a further aspect, the present invention relates to an electrically operated vehicle comprising an electric drive system according to the invention.

According to a further aspect, the present invention relates to a method for traction control in an electric drive system for an electrically operated vehicle, which drive system has a voltage transformer of an electrically operated vehicle that feeds an n-phase electric machine, $n \geq 1$. The method comprises the following steps: determining a present rotational speed of the electric machine and a present output current of the voltage transformer, computing an instantaneous wheel speed of the wheels of the vehicle in dependence on the determined present rotational speed, and applying at least temporarily a current correction amount to the output current of the voltage transformer if the present change of the wheel speed of the wheels exceeds a first predetermined threshold value.

A concept of the present invention is to implement a traction control system in an electrically operated vehicle, such as, for example, an electric car or a hybrid vehicle, which traction control system uses signal detectors or respectively electrical parameters of the system that are already present in the electrical drive system in order to be able to make a decision whether and to what extent the target torque is to be reduced by means of adapting the output current of the voltage transformer of the electric drive system. An advantage with the procedural approach according to the invention is that the target torque can always be adapted to the effect that as much torque of the drive as possible can be transferred to the road surface and the wheels can be prevented from spinning.

A significant advantage of this procedural approach is that no additional sensors, such as steering angle sensors, acceleration sensors and wheel speed sensors, have to be implemented in the electric drive system or respectively in the vehicle; thus enabling the implementation costs of the traction control to be held to a minimum.

The invention can be used in vehicles having an electric drive, such as, for example, front-wheel drive, rear-wheel drive or four-wheel drive. Electrically operated vehicles in the sense of the invention can be vehicles comprising one or a plurality of electric motors, said vehicles, as the case may be, being also equipped with internal combustion engines.

According to one embodiment of the control device, the computing unit is designed to compute a present vehicle speed of the vehicle from the determined present output current and to compare the computed present vehicle speed of the vehicle with the wheel speed of the wheels of the vehicle that is dependent on the determined present rotational speed and to at least temporarily apply a correction amount to the output current of the voltage transformer if the wheel speed of the wheels deviates from the computed present vehicle speed of the vehicle by more than a second predetermined threshold value.

According to a further embodiment of the control device, the computing unit can furthermore be designed to compute a present drive torque from the determined present output current, to correct the computed present drive torque by a present driving resistance in order to calculate a drive torque applied to the wheels and to use the corrected drive torque applied to the wheels for computing the present vehicle speed of the vehicle.

According to a further embodiment of the control device, the slip control unit can furthermore be designed to at least temporarily apply a current correction amount to the output current of the voltage transformer if the present change of the wheel speed of the wheels deviates by more than a third predetermined threshold value from the change of the computed present vehicle speed of the vehicle.

According to one embodiment of the method, the method can furthermore comprise the following steps: computing a present vehicle speed of the vehicle from the determined present output current, comparing the computed present vehicle speed of the vehicle with the wheel speed of the wheels of the vehicle which is dependent on the determined present rotational speed and at least temporarily applying a current correction amount to the output current of the voltage transformer if the wheel speed of the wheels deviates by more than a second predetermined threshold value from the computed present vehicle speed of the vehicle.

According to a further embodiment of the method, the computing of the present vehicle speed of the vehicle can comprise: computing the present drive torque from the determined present output current, correcting the computed present drive torque by a present driving resistance in order to compute a drive torque applied to the wheels and computing the present vehicle speed of the vehicle by way of the corrected drive torque applied to the wheels.

According to a further embodiment of the method, the method can furthermore comprise the step of temporarily applying a current correction amount to the output current of the voltage transformer if the present change of the wheel speed of the wheels deviates by more than a third predetermined threshold value from the change in the computed present vehicle speed of the vehicle.

BRIEF DESCRIPTION OF THE DRAWINGS

Further features and advantages of embodiments of the invention become apparent in the following description with reference to the attached drawings.

In the drawings.

DETAILED DESCRIPTION

Figure 1:
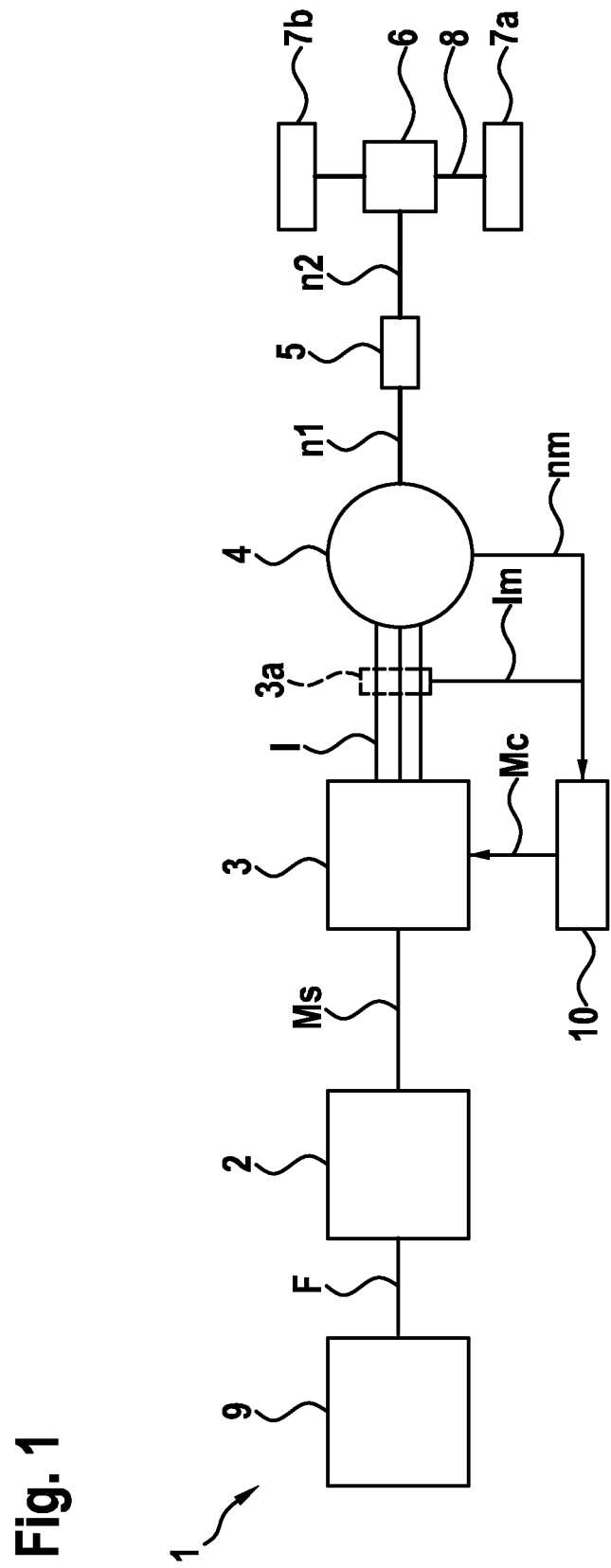
FIG. 1 shows a schematic depiction of an electric drive system for an electrically operated vehicle pursuant to one embodiment of the present invention.

FIG. 1 shows an electric drive system 1 comprising a driver's request sensor 9, a vehicle control unit 2, a voltage transformer 3 and an electric machine 4. Multi-phase current is fed into the electric machine 4 by means of a voltage transformer 3, for example in the form of a pulse width modulated inverter. To this end, a DC voltage provided by a DC voltage intermediate circuit (not shown) can be converted into an n-phase AC voltage, for example a three-phase AC voltage. The voltage transformer 3 is used to convert DC voltage or AC voltage, which is provided by one or a plurality of energy storage devices (not shown) of the vehicle, into an n-phase AC voltage. It may also be possible for the energy storage devices of the vehicle to be integrated into the voltage transformer 3, for example in a battery direct converter (BDI). To this end, the voltage transformer 3 can have energy storage cell modules comprising batteries 5a to 5n connected in series, for example lithium ion batteries which are connected to input connections of associated coupling devices by means of connection lines. The coupling elements of the coupling devices can be actuated in such a way, for example, with the aid of the control device 10 that the individual energy storage cell modules are used selectively for the voltage supply of the electric machine 4. By means of a suitable actuation of the coupling devices, individual energy storage cell modules can be used in a targeted manner for the provision of an instantaneous output voltage of the voltage transformer 3.

Three phase lines are shown by way of example in FIG. 1, which are suitable for outputting a three-phase AC voltage, for example for a three-phase machine 4. It is, however, clear any other number n, n≥1, of phases for other types of machines may likewise be possible. The electric machine 4 can, for example, comprise an asynchronous machine, a synchronous machine, a switched reluctance machine or a transversal flux machine.

The electric drive system 1 further comprises a control device 10, which is connected to the voltage transformer 3 and with the aid of which said voltage transformer 3 can be controlled in order to provide the desired output voltages to the respective phase connections of the electric machine 4.

The driver of the vehicle, in which the electric drive system 1 is implemented, informs the system of his/her driver's request F via the driver's request sensor 9, for example a gas pedal or another input apparatus. The driver's request F, for example for acceleration, braking or for maintaining the speed, is converted by the vehicle control unit 2 into a corresponding, requested torque Ms, with which the voltage transformer 3 is actuated as a setpoint signal, for example, via a CAN bus. The voltage transformer 3 in turn or respectively the associated control device 10 adjusts the output voltage or respectively the output current I at the transformer output, i.e. at the n phase lines, in such a way that the electric machine 4 can deliver the desired target torque.

The electric machine 4 thus moves the connected motor shaft at a rotational speed of n1, which, as the case may be, can be transformed by means of a transmission 5 in accordance with the gear ratio into a second rotational speed n2. The connected differential 6 then distributes the torque via a wheel axle 8 to one or a plurality of wheels 7a, 7b.

Figure 2:
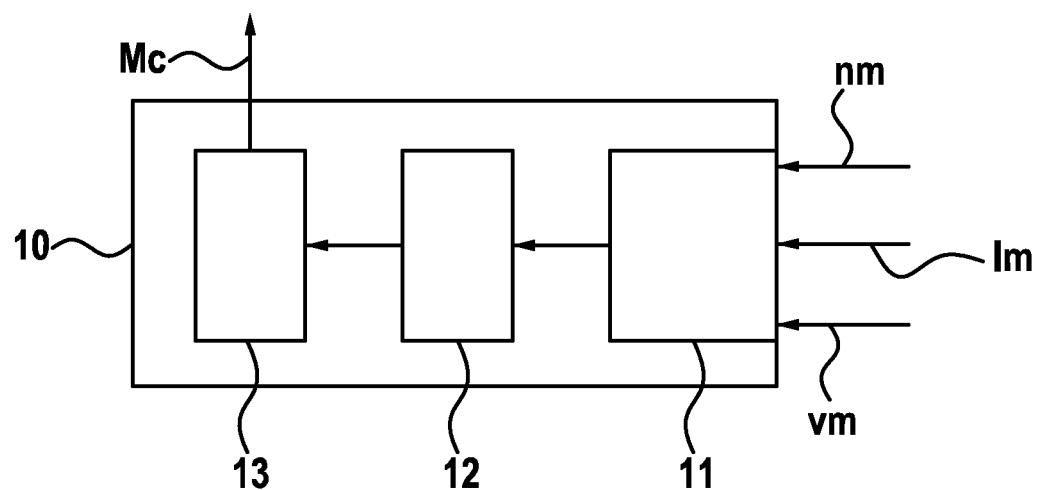
FIG. 2 shows a schematic depiction of a control device for traction control pursuant to a further embodiment of the present invention.

In addition to the usual control for the normal operation of the voltage transformer 3, the control device 10 can furthermore implement a traction control of the electric drive system 1, as is explained further below in connection with FIG. 2. FIG. 2 shows a schematic depiction of a control device 10, which, for example, can be used in the electric drive system 1 of FIG. 1.

The control device 10 comprises an observer unit 11, which is designed to determine a present rotational speed nm of the electric machine 4 and a present output current Im of the voltage transformer 3. The present rotational speed nm can, for example, be tapped directly at the electric machine 4 or at the motor shaft. The present output current Im of the voltage transformer 3 can, for example, be tapped via a current sensor 3a at the phase lines of the electric machine 4. The observer unit 11 is coupled to a computing unit 12 and transmits the determined parameters nm and Im to the computing unit 12. Said computing unit in turn can be designed to compute a present vehicle speed of the vehicle from the determined present output current.

To this end, the computing unit 12 can, for example, compute a present drive torque from the output current. The present drive torque is hereby proportional to the determined output current Im. The computing unit 12 computes a corrected drive torque, which is actually applied to the wheels 7a, 7b, by subtracting a speed-dependent driving resistance from the present drive torque. By means of the estimated or known vehicle weight, it is possible to suggest the acceleration of the vehicle from the corrected drive torque. An integration via the present acceleration of the vehicle over a measurement period of time enables the vehicle speed to be determined.

In order to validate or respectively increase the accuracy of the determination of the vehicle speed by the computing unit 12, the observer unit 11 can furthermore determine one or a plurality of input variables vm for improving the estimated vehicle speed. The input variable vm can, for example, be a vehicle speed known to the GPS system of the vehicle or a similar external parameter. The computing unit 12 can correspondingly take this input variable vm into account when computing the vehicle speed of the vehicle.

In addition, it is possible to correct the vehicle speed within the framework of boundary conditions during known driving situations. For example, it can be inferred from a very low torque that is applied to the wheels over a certain period of time that the wheel speed corresponds to the vehicle speed. In the case of a positive drive torque, the conclusion can also be drawn that the vehicle speed may not undershoot the wheel speed.

The computing unit 12 can finally compare the computed present vehicle speed of the vehicle with the wheel speed of the wheels of the vehicle that is dependent on the determined present rotational speed nm. The computing unit 12 can particularly determine a time dependent course of the slip of the wheels 7a, 7b by way of the comparison of vehicle speed and wheel speed. This course of the slip can be transmitted forward to a slip control unit 13 which is coupled to the computing unit 12.

The slip control unit 13 can be designed to at least temporarily apply a current correction amount to the output current I of the voltage transformer 3 (and thus to the target torque) if the wheel speed of the wheels deviates from the computed present vehicle speed of the vehicle by more than a predetermined threshold value, i.e. if the slip of the wheel exceeds the predetermined threshold value.

Because this type of slip control is greatly dependent on the quality of the vehicle speed computation or respectively determination, it can be advantageous to access a control mechanism which is not necessarily dependent on the vehicle speed computation. For this purpose, the slip control unit 13 can be designed to at least temporarily apply a current correction amount to the output current I of the voltage transformer 3 if the present change of the wheel speed of the wheels exceeds another predetermined threshold value, i.e. if too fast of a change in traction takes place.

Finally, it is also alternatively or additionally possible by means of the slip control unit 13 to at least temporarily apply a current correction amount to the output current I of the voltage transformer 3 if the present change of the wheel speed of the wheels deviates from the change in the computed present vehicle speed of the vehicle by more than a third predetermined threshold value, i.e. if a wheel acceleration that is too high exists. The latter case does not draw upon the absolute value of the computed present vehicle speed but upon a relative change in the absolute value. As a result, possible deviations to the absolute values of the computed present vehicle speed do not carry so much weight.

To this end, the slip control unit 13 emits an output current control signal Mc for the voltage transformer 3 in order to carry out the traction control. In accordance with said control signal Mc, the actuation of the voltage transformer 3 is modified such that the output current I of the voltage transformer 3 and thus the output torque are correspondingly changed or respectively reduced by the current correction amount. The amount of the reduction can be adjusted with the aid of the computed slip or respectively the change in slip and a frictional coefficient determined therefrom.

The current correction amount (which is different from zero) can preferably be subtracted in each case from the output current I of the voltage transformer 3 in all control scenarios so that the output current I of the voltage transformer 3 is reduced by the current correction amount. The current correction amount can be basically any size, wherein the size of the current correction value can be dependent on a predetermined amount of the desired control effect of the traction control.

For reasons of stabilization, the modification to the output current I of the voltage transformer 3 by the current correction amount can be completely or partially maintained over a predetermined period of time in order to be able to observe the rotational speed of the motor during this period of time for stabilization. In the event that the traction slip is still situated in an inadmissible range after this stabilization period of time, a more extensive control intervention can be performed via the output current control signal Mc. In the event that the wheels 7a, 7b have however stabilized again after the control intervention, the reduction in the output current I is again suspended after the stabilization period of time.

It may also be possible to set up a temporarily continuous traction control operation, in which the output current I of the voltage transformer 3 is modified by the current control amount on a long-term basis. This can particularly then be useful if a special driving situation exists, for example when driving uphill on a snow covered or icy road. In general, the traction control implemented by means of the control unit 10 can therefore be activated for a short period of time in the range of a few seconds up to a basically unlimited, long-term period of time consisting of a plurality of minutes or even hours.

Figure 3:
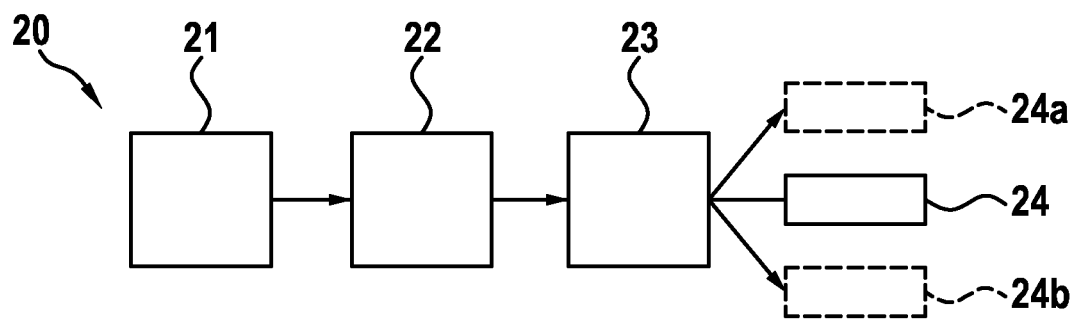
FIG. 3 shows a schematic depiction of a method for traction control in an electric drive system pursuant to a further embodiment of the present invention.

FIG. 3 shows a schematic illustration of a method 20 for traction control in an electric drive system for an electrically operated vehicle. The method 20 can particularly be implemented in an electric drive system comprising a control device 10 pursuant to FIGS. 1 and 2.

In a first step 21, a current rotational speed nm of the electric machine 4 and a present output current Im of the voltage transformer 3 are determined. In a second step 22, an instantaneous wheel speed of the wheels of the vehicle is computed in dependence on the determined present rotational speed nm. Finally, in a third step 24, a current correction amount can at least temporarily be applied to the output current I of the voltage transformer 3 if the present change of the wheel speed of the wheels exceeds a first predetermined threshold value.

Parallel to step 22, a present vehicle speed of the vehicle can also in each case be computed from the determined present output voltage Im in steps 23a and 23b and the computed present vehicle speed of the vehicle can be compared with the wheel speed of the wheels, which is dependent on the determined present output current; thus enabling a current correction amount to be applied at least temporarily to the output current I of the voltage transformer 3 in an optional step 24a if the wheel speed of the wheels deviates from the computed present vehicle speed by more than a second predetermined threshold value. In so doing, the computation of the present vehicle speed of the vehicle in step 23a can, for example, comprise a computation of a present drive torque from the determined present output current Im, a correction of the computed present drive torque by a present driving resistance in order to compute a drive torque applied to the wheels and a computation of the current vehicle speed of the vehicle by means of the corrected drive torque applied to the wheels.

Optionally in step 24b, a current correction amount can additionally be applied likewise at least temporarily to the output current I of the voltage transformer 3 if the present change in the wheel speed of the wheels exceeds a predetermined threshold value and/or if the instantaneous change in the wheel speed of the wheels deviates from the change in the computed present vehicle speed of the vehicle by more than a third predetermined threshold value.

The invention claimed is:

1. A control device (10) for a voltage transformer (3) of an electrically operated vehicle, which voltage transformer feeds an n-phase electric machine (4), n≥1, comprising:
   an observer (11), configured to determine a present rotational speed (nm) of the electric machine (4) and a present output current (Im) of the voltage transformer (3);
   a computing unit (12), coupled to the observer (11) and configured to compute an instantaneous wheel speed of the wheels of the vehicle based on the determined present rotational speed (nm); and
   a slip control (13), coupled to the computing unit (12) and configured to at least temporarily apply a current correction amount to the output current (I) of the voltage transformer (3) if the present change of the wheel speed of the wheels exceeds a first predetermined threshold value.

2. The control device (10) according to claim 1, wherein the slip control (13) is further configured to compute a present vehicle speed of the vehicle from the determined present output current (Im) and to compare the computed present vehicle speed of the vehicle with the wheel speed of the wheels of the vehicle, which is dependent on the determined present rotational speed (nm), and to apply at least temporarily a current correction amount to the output current (I) of the voltage transformer (3) if the wheel speed of the wheels deviates from the computed present vehicle speed of the vehicle by more than a second predetermined threshold value.

3. The control device (10) according to claim 2, wherein the computing unit (12) is further configured to compute a present drive torque from the determined present output current (Im), to correct the computed present drive torque by a present driving resistance in order to compute a drive torque applied to the wheels and to use the corrected drive torque applied to the wheels to compute the present vehicle speed of the vehicle.

4. The control device (10) according to claim 3, wherein the slip control (13) is further configured to at least temporarily apply a current correction amount to the output current (I) of the voltage transformer (3) if the present change of the wheel speed of the wheels deviates from the change in the calculated present vehicle speed of the vehicle by more than a third predetermined threshold value.

5. The control device (10) according to claim 2, wherein the slip control (13) is further configured to at least temporarily apply a current correction amount to the output current (I) of the voltage transformer (3) if the present change of the wheel speed of the wheels deviates from the change in the calculated present vehicle speed of the vehicle by more than a third predetermined threshold value.

6. An electric drive system (1) for an electrically operated vehicle, comprising:
   an n-phase electric machine (4), with n≥1;
   a voltage transformer (3) coupled to the n-phase electric machine (4) and configured to provide an n-phase supply voltage for the electric machine (4); and
   a control device (10) according to claim 1, which is coupled to the electric machine (4) and to the voltage transformer (3) and which is configured to provide an output current control signal (Mc) for the voltage transformer (3) for the traction control.

7. An electrically operated vehicle comprising an electric drive system according to claim 6.

8. A method (20) for traction control in an electric drive system (1) for an electrically operated vehicle, which drive system includes a voltage transformer (3) of an electrically operated vehicle that feeds an n-phase electric machine (4), n≥1, wherein the method comprises the following steps:
   determining (21) a present rotational speed (nm) of the electric machine (4) and a present output current (Im) of the voltage transformer (3);
   computing an instantaneous wheel speed of the wheels of the vehicle based on the determined present rotational speed (nm); and
   at least temporarily applying (24) a current correction amount to the output current (I) of the voltage transformer (3) if the present change of the wheel speed of the wheels exceeds a first determined threshold value.

9. The method (20) according to claim 8, further comprising the following steps:
   computing (23a) a present vehicle speed of the vehicle from the determined present output current (Im);
   comparing (23b) the computed present vehicle speed of the vehicle with the wheel speed of the wheels of the vehicle that is based on the determined present rotational speed (nm); and
   at least temporarily applying (24a) a current correction amount to the output current (I) of the voltage transformer (3) if the wheel speed of the wheels deviates from the determined present vehicle speed of the vehicle by more than a second predetermined threshold value.

10. The method (20) according to claim 9, wherein computing (23a) the present vehicle speed of the vehicle comprises:
   computing a present drive torque from the determined present output current (Im);
   correcting the determined present drive torque by a present driving resistance in order to compute a drive torque applied to the wheels; and
   computing the present vehicle speed of the vehicle using the corrected drive torque applied to the wheels.

11. The method (20) according to claim 9, further comprising the step:
   at least temporarily applying (24b) a current correction amount to the output current (I) of the voltage transformer (3) if the present change of the wheel speed of the wheels deviates from the change in the determined present vehicle speed of the vehicle by more than a third predetermined threshold value.

* * * * *